F. L. MORSE.
SPROCKET GEAR WHEEL.
APPLICATION FILED OCT. 28, 1915.
1,386,272.
Patented Aug. 2, 1921.
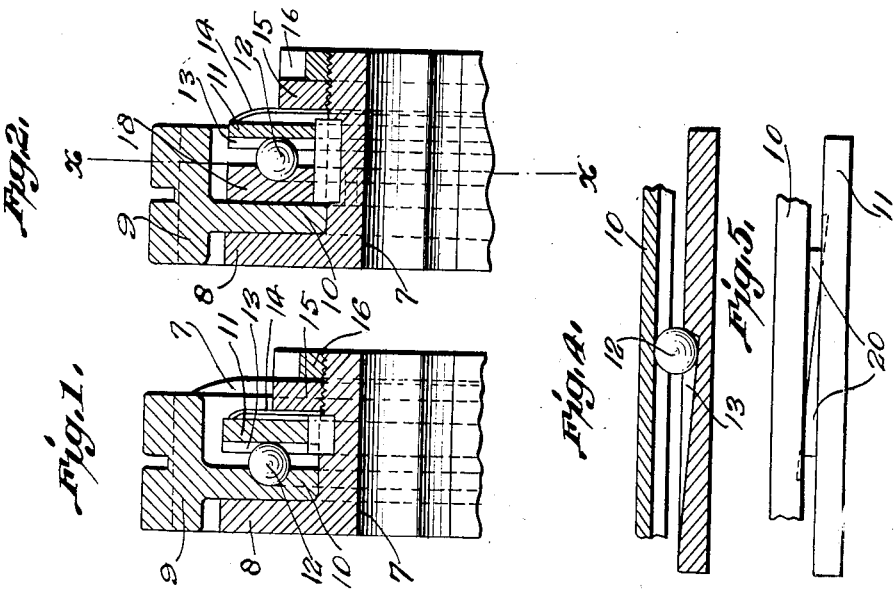
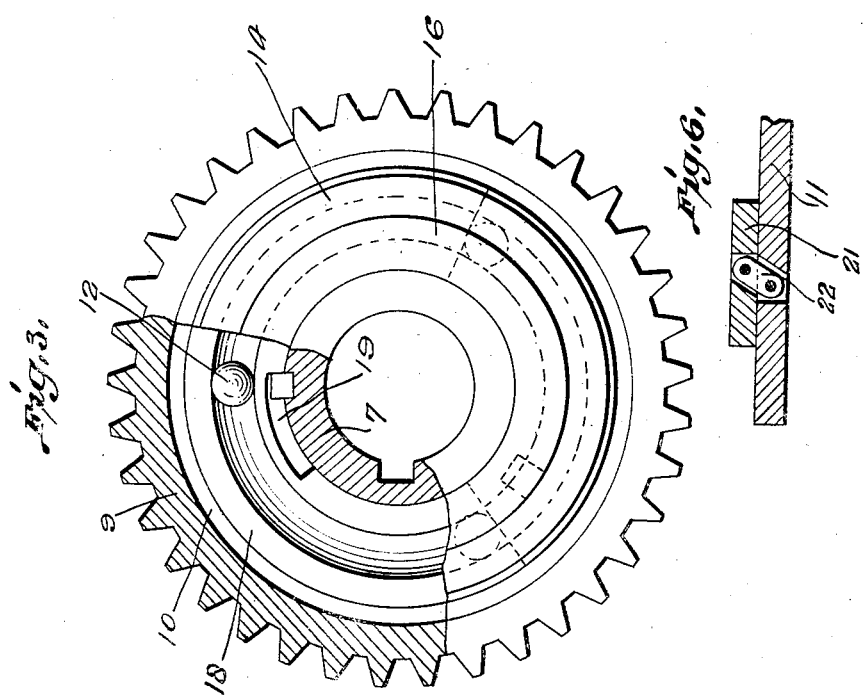
Inventor
Frank L. Morse
by Edward A. Wright
Atty.

UNITED STATES PATENT OFFICE.

FRANK L. MORSE, OF ITHACA, NEW YORK, ASSIGNOR TO MORSE CHAIN COMPANY, OF ITHACA, NEW YORK, A CORPORATION OF NEW YORK.

SPROCKET GEAR-WHEEL.

1,386,272.      Specification of Letters Patent.      Patented Aug. 2, 1921.

Application filed October 28, 1915. Serial No. 58,312.

*To all whom it may concern:*

Be it known that I, FRANK L. MORSE, a citizen of the United States, residing at Ithaca, in the county of Tompkins and State of New York, have invented a certain new and useful Improvement in Sprocket Gear-Wheels, of which improvement the following is a specification.

This invention relates to gear wheels, and more particularly to that type in which the gear is formed in two parts, a hub portion adapted to be keyed upon a shaft, and a rim or outer portion carrying the gear teeth or sprockets and so mounted on the hub as to have a rotative movement relative thereto at certain times.

One of the objects of my invention is to provide an improved construction of this type having a friction device for normally causing the two parts to rotate together but adapted to slip and permit a relative rotary movement between the parts when the stress upon the driving chain or gear exceeds a certain amount. Another object is to provide a gear of this type having an improved clamping means for automatically locking the two parts together when the shaft member is being rotated in one direction, but adapted to release the locking means when turned in the opposite direction.

Another object is to provide an improved combined friction clutch and locking device adapted to yieldingly force the frictional parts together with a predetermined degree of pressure when the power is applied in a given direction to one of the members, and to rigidly clamp or lock the parts together when the power is applied to the other member of the wheel.

My improvement is particularly adapted for use in the connection between the shaft of an internal combustion engine and an electric motor-generator in which the latter operates as a generator when driven by the engine, but also serves as a motor in starting the engine. When the sprocket wheel is driving the generator the strain on the drive chain is limited to that desired amount which will cause the friction surfaces to slide and permit relative rotary movement between the parts of the sprocket wheel, but when the motor is used for starting the engine, the automatic clutch or clamping means operates to rigidly lock the parts of the sprocket wheel together so that it turns as one unit.

In the accompanying drawing: Figure 1 is a transverse section of one half of one form of a sprocket gear wheel embodying my improvement; Fig. 2, a similar view showing a slight modification; Fig. 3, a view, partly in side elevation and partly in section, on the line $x$—$x$ of Fig. 2; Fig. 4, a section showing a form of roller clutch or clamping means; Fig. 5, a view indicating another form of clutch; and Fig. 6, a similar view showing another modification of clutch device.

As shown in Fig. 1 of the drawing, the sprocket wheel comprises a hub portion, 7, adapted to be keyed upon a shaft and having a transversely extending flange, 8, and an outer or rim portion, 9, having a web, 10, the rim portion being mounted with the capacity of rotary movement relative to the hub, and the web bearing against the flange of the hub for producing frictional resistance. A spring, 14, is employed for exerting a predetermined degree of pressure between these parts and causing the same to rotate together when turning in one direction, by power applied first to one part, such as the hub, until the stress applied to the wheel exceeds the said frictional resistance, whereupon the friction faces slide upon each other and one portion of the wheel rotates relative to the other, the sprocket chain being thereby relieved of excessive stress. The frictional resistance may be varied by adjusting the spring.

When the power is applied in the opposite direction, that is to the other member of the wheel first, it is desired that the parts should be locked together, and for this purpose I provide a clutch device operated automatically by a limited relative rotary movement between said parts for rigidly clamping the same together. One form of such device may comprise a clutch ring 11, movable longitudinally of the hub, 7, but fixed to rotate therewith and having inclined seats, 13, for engaging rollers or balls, 12, which operate in a circular groove in the opposite web member, 10, as indicated in Fig. 1. The spring, 14, bears upon the clutch ring and, acting through the balls, exerts the desired pressure between the web, 10, and flange, 8, for producing the frictional resistance between these parts. The force of the spring may be adjusted by shifting the nut, 15, and lock nut, 16.

When the power is being transmitted from the rim portion to the hub, as when using the motor to start the engine, there is at first a limited relative rotary movement between the rim portion and the hub during which the rollers or balls are rolled up the inclined face of their seats. This movement serves to force back the clutch ring to compress the spring solid against the nut, 15, and rigidly clamp the parts together, so that they then turn as one integral wheel.

When the power is applied in the opposite direction, that is from the hub to the rim portion, the shaft still turning in the same direction as before, the balls roll out to the lowest position at ends of their inclined seats, and the rim portion continues to revolve with the hub through the frictional engagement between the flange, 8, and web, 10, which are pressed against each other by the force of the spring, 14, acting through the ring, 11, and balls, 12, as before described. During this movement, the balls remain fixed in their positions. If the power transmitted is great enough to exceed the frictional resistance exerted between the parts, the frictional surfaces will then slide upon each other as the rim portion rotates relative to the hub, and the balls then simply roll in the groove in the web and revolve against the faces of their seats in the clutch ring.

In Figs. 2 and 3, I have shown an additional friction ring, 18, inserted between the balls and the web and containing the groove for the balls, said ring being slidably mounted longitudinally on the hub and having a short curved slot, 19, shown in Fig. 3, engaging the key on the shaft for permitting a limited rotary movement of the same relative to the shaft in order to set up the rollers or balls to clamp the parts rigidly together. When the power is applied to the rim portion to start the engine shaft, the ring, 18, moves with the web, 10, through the limited rotary movement relative to the hub and clutch member, 11, thereby wedging the balls on their inclined seats and rigidly clamping the parts together so that all rotate as one. When the power is transmitted in the opposite direction, the friction is developed on both sides of the web, 10, by the pressure of the spring, and in case this frictional resistance is overcome and the rim slides with a relative rotary movement on the hub, the ring, 18, turns with the hub so that the continuous rotation of the balls is avoided.

A dust cap, 17, in the form of a sheet metal plate may be supported on the hub between the nuts, 15 and 16, and bear against the rim of the wheel at its outer edge for excluding the dirt and dust from the movable parts of the wheel.

It will be apparent that other forms of clutch devices, operated by a limited relative rotary or angular movement between the parts of the wheel may be employed in the place of the roller clutch device, such as shown for instance, in Fig. 5, in which the clutch ring and web are provided with projecting teeth, 20, having reversely inclined surfaces engaging each other and coöperating to spread the members apart and rigidly clamp the same together.

Another form of clutch device is shown in Fig. 6, in which the clutch ring is provided with a block, 21, having a toggle connection, 22, with the ring, and adapted to spread the members apart upon a relative movement in the direction to extend the toggle connection. Various other changes in the form and detailed construction of the apparatus may be made without departing from my invention.

Having now described my invention, what I claim as new and desire to secure by Letters Patent is:

1. A sprocket wheel comprising a hub portion, a rim portion mounted thereon with the capacity of relative rotary movement, a friction producing means for holding said parts together with a certain limited degree of pressure when power is transmitted in one direction, and a device for automatically clamping said parts rigidly together when the power is transmitted in the opposite direction.

2. A sprocket wheel comprising a hub portion, a rim portion mounted thereon with the capacity of relative rotary movement, a spring actuated friction clutch means for holding said parts together with a given degree of pressure when the power is applied to one portion, and means actuated by a limited relative rotary movement between said parts for clamping the same rigidly together when the power is applied to the other portion.

3. A sprocket wheel comprising a hub portion having a flange, a rim portion having a web mounted on the hub with the capacity of relative rotary movement, a spring for forcing said web into frictional engagement with said flange, and means actuated by a limited relative rotary movement in one direction for compressing said spring and clamping said parts rigidly together.

4. A sprocket wheel comprising a hub portion having a flange, a rim portion having a web mounted on the hub with the capacity of relative rotary movement, a clutch ring fixed to turn with said hub and having inclined surfaces, a spring acting on said ring longitudinally of the hub, and rollers engaging said inclined surfaces on said ring.

5. A sprocket wheel comprising a hub portion having a flange, a rim portion having a web mounted on the hub with the capacity of relative rotary movement, a friction plate bearing against the other side of said web but having only a limited rotary movement relative to the hub, a clutch ring with inclined surfaces fixed to turn with the hub but slidable longitudinally thereof, a spring acting on said clutch ring, and rollers located between the friction plate and the clutch ring and engaging said inclined surfaces.

In testimony whereof I have hereunto set my hand.

FRANK L. MORSE.